US007847426B1

(12) United States Patent
Griffith et al.

(10) Patent No.: US 7,847,426 B1
(45) Date of Patent: Dec. 7, 2010

(54) WIND POWER GENERATION

(75) Inventors: Saul Griffith, San Francisco, CA (US); Peter Lynn, Alameda, CA (US); Corwin Hardham, San Francisco, CA (US)

(73) Assignee: Makani Power, Inc., Alameda, CA (US)

( * ) Notice: Subject to any disclaimer, the term of this patent is extended or adjusted under 35 U.S.C. 154(b) by 455 days.

(21) Appl. No.: 11/903,521

(22) Filed: Sep. 20, 2007

(51) Int. Cl.
*F03D 9/00* (2006.01)

(52) U.S. Cl. ............................ 290/44; 290/55; 416/11; 417/7

(58) Field of Classification Search .................. 290/43, 290/44, 54, 55; 416/189, 11, 84, 132; 417/7
See application file for complete search history.

(56) References Cited

U.S. PATENT DOCUMENTS 3,987,987 A 10/1976 Payne et al.
4,084,102 A * 4/1978 Fry et al. ...................... 290/55
4,165,468 A 8/1979 Fry et al.
4,207,026 A * 6/1980 Kushto ........................ 416/84
4,242,043 A * 12/1980 Poulsen ....................... 416/11
4,251,040 A 2/1981 Lyod
4,285,481 A * 8/1981 Biscomb ...................... 244/33
4,450,364 A * 5/1984 Benoit ......................... 290/55
4,491,739 A 1/1985 Watson
4,832,571 A * 5/1989 Carrol .................... 416/132 B
5,311,706 A 5/1994 Sallee
5,421,128 A 6/1995 Sharpless
5,677,023 A 10/1997 Brown
5,735,083 A 4/1998 Brown et al.
6,182,398 B1 2/2001 Head
6,616,402 B2 9/2003 Selsam
6,692,230 B2 2/2004 Selsam
6,781,254 B2 * 8/2004 Roberts ....................... 290/55
7,335,000 B2 * 2/2008 Ferguson ....................... 417/7

* cited by examiner

*Primary Examiner*—Nicholas Ponomarenko
(74) *Attorney, Agent, or Firm*—Van Pelt, Yi & James LLP

(57) ABSTRACT

A wind power generating system is disclosed. The wind power generating system comprises a plurality of blades to capture wind energy; a shaft coupled to the plurality of blades, and a power extractor for extracting power from the rotation of the plurality of blades. A rotation of the plurality of blades occurs in response to the captured wind energy, and a lift force is generated from the captured wind energy by the plurality of blades that is substantially along the shaft.

12 Claims, 7 Drawing Sheets

510 511 509 510 501 503 504 504 512 502 506 508 516 514 500 508 505 507

WIND POWER GENERATION

BACKGROUND OF THE INVENTION

Typical commercial wind power generators include tall tower structures that must not only counteract the force of the wind impinging upon the wind capturing blade structures causing bending of the tower and blades, but also support the weight of the blade structures as well as a power generator. These requirements limit the economics of wind power generation. A first problem is that in order to scale the amount of power generated either the number of wind power generators must be increased or the amount of power produced by each generator must be increased. For a situation where more wind power generators are created, each wind generator must support the cost of a tower, a plurality of blades, and a generator. For a situation where more power is required from each generator, longer (and hence heavier) blades are coupled to a larger (and hence heavier) generator which are all supported by a tower that is both taller from the longer blades and that needs to support more weight and more bending. These factors increase the cost of each generator at the same time as the design of the wind power generator is attempting to produce more power to be more profitable.

BRIEF DESCRIPTION OF THE DRAWINGS

Various embodiments of the invention are disclosed in the following detailed description and the accompanying drawings.

DETAILED DESCRIPTION

Figure 1A:
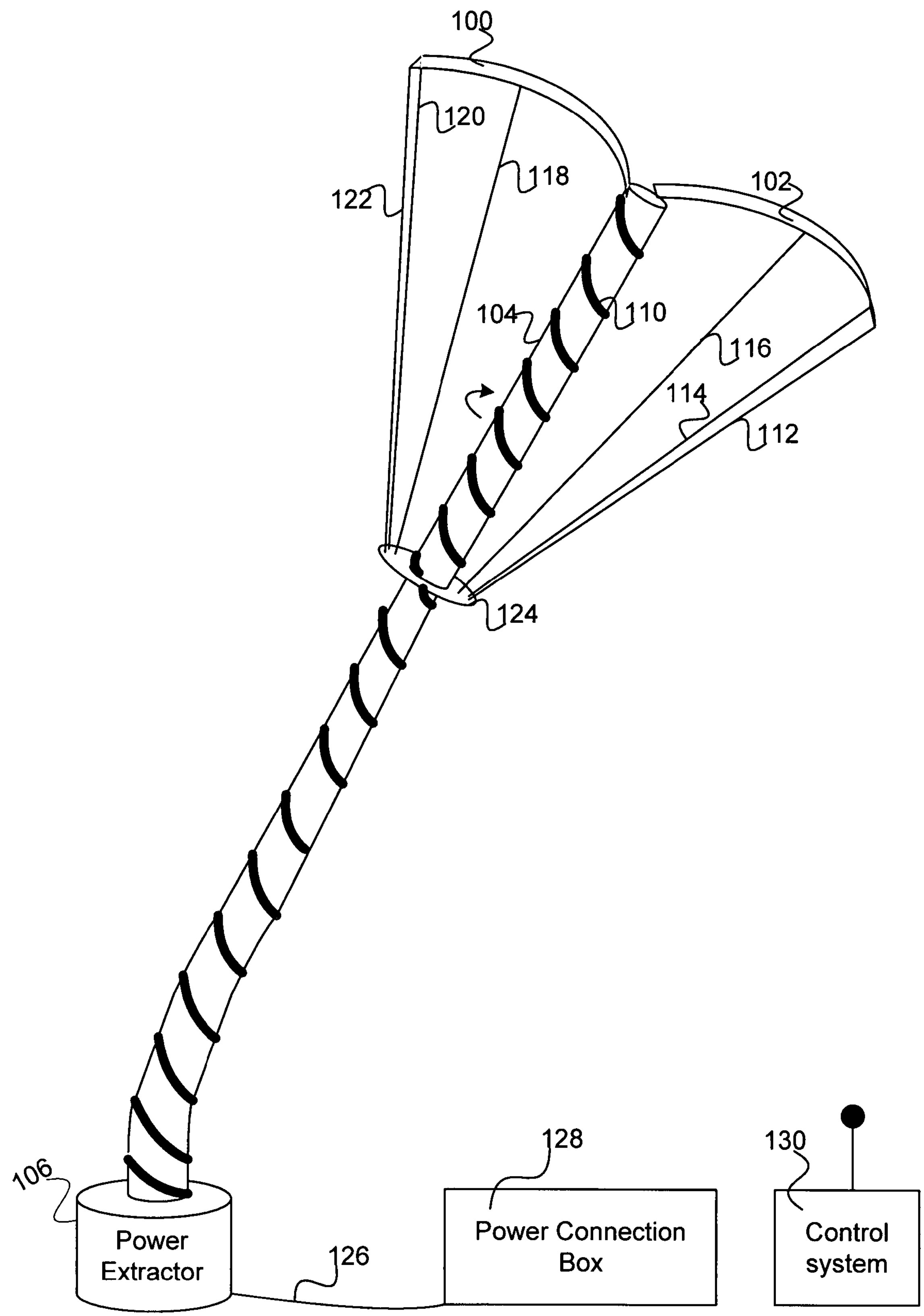
FIG. 1A is a block diagram illustrating an embodiment of a lift supported wind power generating system.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A wind power generating system is disclosed. A plurality of blades capture wind energy. The wind energy is transmitted to the plurality of blades causing a rotation. The rotation of the plurality of blades is used by a power extractor to extract power.

In various embodiments, the shaft is directly coupled to the plurality of blades or coupled via a bearing. The shaft comprises a flexible and inflatable structure. In various embodiments, the energy from the rotation of the plurality of blades is transferred to the power extractor using the shaft, using guy lines, using a mounting plate, and/or any other appropriate manner of transferring energy to a power extractor. A lift force is generated from the captured wind energy by the plurality of blades. The lift force is substantially along the shaft (i.e., there is very little aerodynamic lift force that is perpendicular to the shaft as is common in wind turbine systems where there is a substantial bending force that is perpendicular to the support tower from the aerodynamic force of the wind on the blades of the turbine).

In some embodiments, the shaft and the blades are supported by lift generated from the wind impinging on the blades. In some embodiments, the blades and the shaft are made from flexible materials. In some embodiments, the flexible blades are kite shaped or wing shaped. In some embodiments, the blades are shaped using guy lines. In some embodiments, the wind generating system is controlled or steered using a control system. The control system steers or adjusts the wind generating system to tune power generation. Power generation can be increased or decreased by steering the blades over a predetermined path or by adjusting the amount of wind captured by the blades. In some embodiments, fibers are used to help in transmitting torque in the shaft. In various embodiments, the fibers are in ribs along the shaft, in a continuous sheet, in any appropriate configuration for helping to transmit torque from a wind capturing blade to a power extractor.

In some embodiments, the wind power generating system is coupled to the ground using a wrist joint. The wrist joint enables the wind power generating system to move to different angles without rotation with respect to the ground. The wrist joint enables a line to connect to a power extractor without twisting as the wind generating system moves.

In some embodiments, tensile structures that are made from flexible materials supported by lift avoid the issues of resisting bending by the wind and thereby reduce the mass and cost to counteract the bending employed by typical wind power generating tower and blade structures.

FIG. 1A is a block diagram illustrating an embodiment of a wind power generating system. In the example shown, a plurality of flexible blades, represented in FIG. 1A by blade 100 and blade 102, capture wind energy and produce lift. The lift creates a force generated from the plurality of flexible blades predominantly along shaft 104, which is coupled to blades 100 and 102. Note that the lift force is transmitted from the blades by guy lines (e.g., guy lines 112, 114, 116, 118, 120, and 122) and shaft 104 to power extractor 106 and to the ground or base on which power extractor rest above the ground. The flexible blades, when capturing wind energy, cause a torque force on shaft 104 causing shaft 104 to rotate. In some embodiments, shaft 104 includes torque carrying ribs 110, which are force carrying fibers to transmit the torque force down the length of shaft 104. In some embodiments, the torque carrying ribs are a continuous sheet of fibers that transmit torque instead of discrete ribs as is shown in FIG. 1A. In some embodiments, the fibers are a polymer string or a woven polymer such as Kevlar™ In various embodiments, shaft 104 is inflated with hot air or a lighter-than-air gas for buoyancy enabling the wind power generation system to be self-supporting. In some embodiments, shaft 104 is inflated with a higher pressure gas than ambient air pressure to enable better transmission of the torque force from the plurality of blades to the base of shaft 104. In various embodiments, there are two, three, four, five, six, or any other appropriate number of flexible blades coupled to shaft 104 for capturing wind energy.

Guy lines or bridles enable the wind power generation system to be shaped and/or supported using flexible structures. In some embodiments, the guy lines or bridles are faired. In some embodiments, guy lines or bridles are comprised of high strength fibers (e.g., Dyneema®, Kevlar®, Vectran™, and carbon).

In various embodiments, flexible materials used for the plurality of blades and/or shaft 104 composition include polyester, silicon coated fabrics, nylon, Cuben Fiber (e.g., woven from Spectra® threads), Vectran™, or other high strength fiber fabrics.

In various embodiments, the plurality of blades are a kite shape, a wing shape, or any other shape appropriate for capturing wind energy. In some embodiments, the plurality of blades are made from a fabric.

Flexible blades 100 and 102 are shaped by a plurality of guy lines, which are represented by guy lines 112, 114, 116, 118, 120, and 122 in FIG. 1A. The plurality of guy lines are anchored at one end to control motors that are mounted on mounting plate 124, which is coupled to shaft 104. The plurality of guy lines can be used to control and/or steer the wind turbine. In some embodiments, the control is passive—for example, spring loaded guy lines where in high winds (or under high force) the guy lines feather out the plurality of blades so that less wind energy is captured. In some embodiments, the control system is active—for example, control system 130 communicates via radio waves with a number of radio/computer controlled motors (e.g., mounted on guy line anchor 124, not shown in FIG. 1A) feather the plurality of blades so that the wind turbine moves about in a predetermined pattern in the sky. This enables tuning of the power generation by tuning the amount of wind energy that is extracted. In some embodiments, tuning is able to provide a constant average torque to shaft 104 enabling efficient use of a power extractor, such as power extractor 106. In some embodiments, the control system changes the angle/shape of the plurality of flexible blades to control the position of the wind turbine in the sky as well as the speed at which the wind turbine turns. In some embodiments, control system 130 adjusts the shape/angle of the plurality of flexible blades as a function of rotation to control/steer the wind turbine. In some embodiments, control system 130 adjust the plurality of flexible blades to tune the power generation, where capturing more wind energy increases the power generation and capturing less energy decreases the power generation. In some cases, a generator or power extractor has operating points at which greater efficiencies are achieved for power generation. Tuning the wind turbine to match those operating points can make the wind turbine system more effective.

In some embodiments, power extractor 106 comprises a generator that generates power from the rotation of shaft 104. Power extractor 106 is coupled to a power connection box 128 via line 126. In various embodiments, power connection box provides an interface to a power grid, converts the power extracted appropriately to connect to a power network, temporarily stores power to be later accessed, or any other intermediate power processing that is required to make the power extracted from the wind turbine useful to a power network.

In various embodiments, power extractor 106 is a water or air pump or any other mechanical or electrical means for generating or storing (for later extraction) power from a rotational motion.

In some embodiments, shaft 104 is comprised of a number of inflatable trusses. In some embodiments, the trusses are rigid members.

In some embodiments, blade 100 and blade 102 rotate on a bearing with respect to shaft 104 as does mounting plate 124. Rotation of blade 100 and blade 102 is transferred to mounting plate 124 using one or more guy lines—for example, guy lines 112, 114, 116, 118, 120, and 122. Shaft 104 then does not rotate and power is extracted from the rotation of mounting plate 124—for example, power extractors are mounted to bearings/wheels that turn when mounting plate 124 rotates about shaft 104.

Figure 1B:
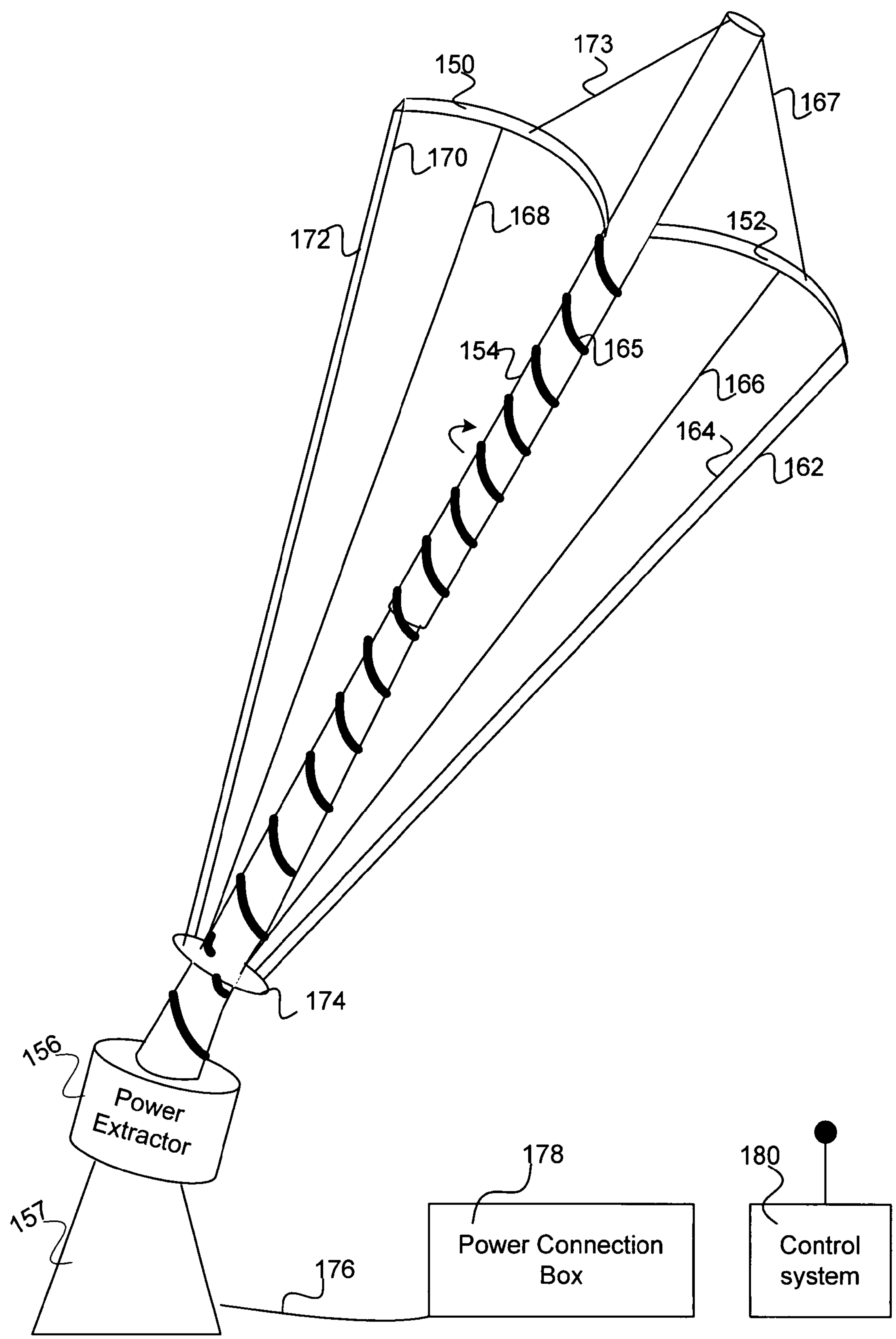
FIG. 1B is a block diagram illustrating an embodiment of a lift supported wind power generating system.

FIG. 1B is a block diagram illustrating an embodiment of a supported wind power generating system. In the example shown, a plurality of flexible blades, represented in FIG. 1B by blade 150 and blade 152, capture wind energy and produce lift. In various embodiments, three or more blades are braced (e.g., with lines and/or poles) circumferentially (not shown in FIG. 1B) between the blades limiting blade bending and distributing the transfer of torque through to shaft 154. The lift force is substantially along shaft 154. Force is transmitted from the blades by guy lines (e.g., guy lines 162, 164, 166, 168, 170, and 172) and shaft 154 to power extractor 106 and to the ground or base on which power extractor rest above the ground. The flexible blades, when capturing wind energy, cause a torque force on shaft 154 causing shaft 154 to rotate. In some embodiments, shaft 154 includes torque carrying ribs 160, which are force carrying fibers to transmit the torque force down the length of shaft 154. In some embodiments, the torque carrying ribs are a continuous sheet of fibers that transmit torque instead of discrete ribs as is shown in FIG. 1B. In some embodiments, the fibers are a polymer string or a woven polymer such as Kevlar™. In various embodiments, shaft 154 is inflated with hot air or a lighter-than-air gas for buoyancy. In some embodiments, shaft 154 is inflated with a higher pressure gas than ambient air pressure to enable better transmission of the torque force from the plurality of blades to the base of shaft 154. In various embodiments, there are two, three, four, five, six, or any other appropriate number of flexible blades coupled to shaft 104 for capturing wind energy.

In various embodiments, the plurality of blades are a kite shape, a wing shape, or any other shape appropriate for capturing wind energy. In some embodiments, the plurality of blades are made from a fabric. In various embodiments, the fabric for the blades comprises polyester, silicon coated fabrics, nylon, Cuben Fiber (e.g., woven from Spectra® threads), Vectran™, or other high strength fiber fabrics. In some embodiments, shaft 104 is made from fabric. In various embodiments, the fabric for shaft 154 comprises polyester, silicon coated fabrics, nylon, Cuben Fiber (e.g., woven from Spectra® threads), Vectran™, or other high strength fiber fabrics.

Flexible blades 150 and 152 are shaped by a plurality of guy lines, which are represented by guy lines 162, 164, 166, 168, 170, and 172 in FIG. 1B as well as guy lines 173 and 167 from above. Note that guy lines 173 and 167 can hold up blades 150 and 152 up against gravity in the absence of wind potentially reducing blade structural requirements. The plurality of guy lines are anchored at one end to control motors that are mounted on mounting plate 174, which is coupled to shaft 154. Note that if the anchoring of the guy lines determines the length of shaft 154 that is not required to carry the load that is distributed in the guy lines. The design of the anchor point determines in part the structural requirements (e.g., load carrying capability) of shaft 154. The plurality of guy lines can be used to control and/or steer the wind turbine. In some embodiments, the control is passive—for example, spring loaded guy lines where in high winds (or under high force) the guy lines feather out the plurality of blades so that less wind energy is captured. In some embodiments, the control system is active—for example, control system 180 communicates via radio waves with a number of radio/computer controlled motors (e.g., mounted on guy line anchor 174, not shown in FIG. 1B) feather the plurality of blades so that the wind turbine moves about in a predetermined pattern in the sky. This enables tuning of the power generation by tuning the amount of wind energy that is extracted. In some embodiments, tuning is able to provide a constant average torque to shaft 154 enabling efficient use of a power extractor, such as power extractor 156. Power extractor 156 is mounted on base 157 that tilts to accommodate the angle of shaft 154 with respect to the ground. In some embodiments, base 157 comprises a spring mounted rotating base. After winding several turns, base 157 can unwind the spring either by releasing the windings and reattaching the spring or mechanically unwinding using a motor (e.g., power extractor 156 used as a motor). In some embodiments, the control system changes the angle/shape of the plurality of flexible blades to control the position of the wind turbine in the sky as well as the speed at which the wind turbine turns. In some embodiments, control system 180 adjusts the shape/angle of the plurality of flexible blades as a function of rotation to control/steer the wind turbine. In some embodiments, control system 180 adjust the plurality of flexible blades to tune the power generation, where capturing more wind energy increases the power generation and capturing less energy decreases the power generation. In some cases, a generator or power extractor has operating points at which greater efficiencies are achieved for power generation. Tuning the wind turbine to match those operating points can make the wind turbine system more effective.

Power extractor 156 comprises a generator that generates power from the rotation of shaft 154. Power extractor 156 is coupled to a power connection box 178 via line 176. In various embodiments, power connection box provides an interface to a power grid, converts the power extracted appropriately to connect to a power network, temporarily stores power to be later accessed, or any other intermediate power processing that is required to make the power extracted from the wind turbine useful to a power network.

In various embodiments, power extractor 156 is a water or air pump or any other mechanical or electrical means for generating or storing (for later extraction) power from a rotational motion.

In some embodiments, shaft 154 is comprised of a number of inflatable trusses. In some embodiments, the trusses are rigid members.

In some embodiments, blade 150 and blade 152 rotate on a bearing with respect to shaft 154 as does mounting plate 174 and the anchors for guy lines 173 and 167. Rotation of blade 150 and blade 152 is transferred to mounting plate 174 using one or more guy lines—for example, guy lines 162, 164, 166, 168, 170, and 172. Shaft 154 then does not rotate and power is extracted from the rotation of mounting plate 174—for example, power extractors are mounted to bearings/wheels that turn when mounting plate 174 rotates about shaft 154.

In some embodiments, blade 150 and blade 152 support the anchors of kites (e.g., at the tips of blade 150 and blade 152) that are flown at higher heights than blade 150 and blade 152 to capture higher altitude wind.

In some embodiments, power extractor 156 produces a torque reaction causing shaft 154 to twist into an undesired orientation (e.g., an orientation capturing an undesired, too much or too little, wind). By offsetting shaft 154 axis of rotation and/or lift of blades 150 and 152, the torque reaction of power extractor 156 can be counteracted.

Figure 2:
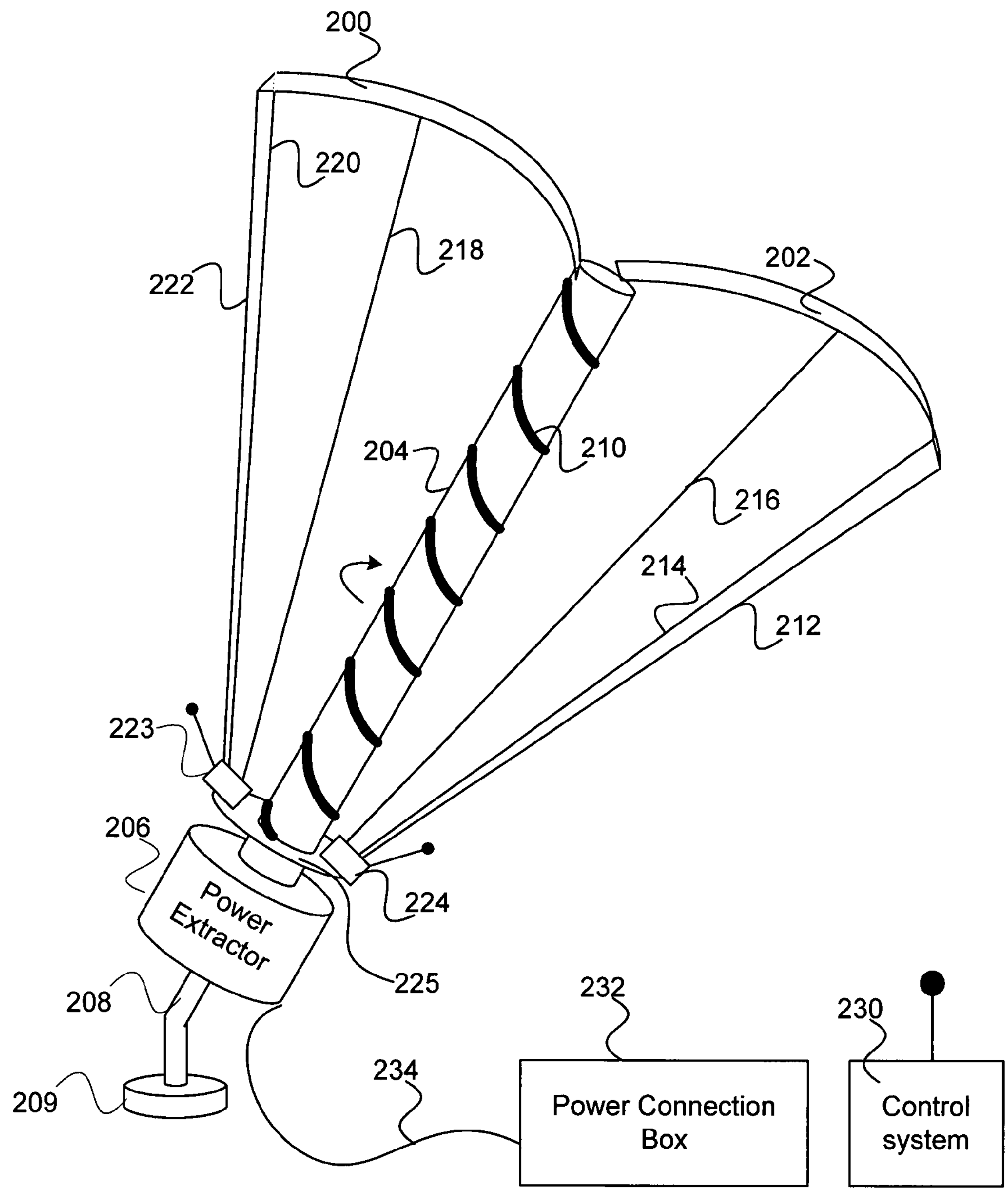
FIG. 2 is a block diagram illustrating an embodiment of a lift supported wind power generating system.

FIG. 2 is a block diagram illustrating an embodiment of a wind power generating system. In the example shown, the a plurality of flexible blades, represented in FIG. 2 by blade 200 and blade 202, capture wind energy and produce lift. The lift force from the plurality of flexible blades provides a force substantially along shaft 204, which is coupled to blades 200 and 202. force is transmitted from the blades by guy lines (e.g., guy lines 212, 214, 216, 218, 220, and 222) and shaft 204 to power extractor 206 and to the ground or base on which power extractor rest above the ground. The flexible blades, when capturing wind energy, cause a torque force on shaft 204 causing shaft 204 to rotate. In some embodiments, shaft 204 includes torque carrying ribs 210, which are force carrying fibers to transmit the torque force down the length of shaft 204. In various embodiments, shaft 204 is inflated with hot air or a lighter-than-air gas for buoyancy. In some embodiments, shaft 204 is inflated with a higher pressure gas than ambient air pressure to enable better transmission of the torque force from the plurality of blades to the base of shaft 104. In various embodiments, there are two, three, four, five, six, or any other appropriate number of flexible blades coupled to shaft 204 for capturing wind energy.

Flexible blade 200 and blade 202 are shaped by a plurality of guy lines, which are represented by guy lines 212, 214, 216, 218, 220, and 222 in FIG. 2. The plurality of guy lines are anchored at one end to control motors that are mounted on mounting plate 225, which is coupled to shaft 204. The plurality of guy lines can be used to control and/or steer the wind turbine. In some embodiments, the control is passive—for example, spring loaded guy lines where in high winds (or under high force) the guy lines feather out the plurality of blades so that less wind energy is captured. In some embodiments, the control system is active—for example, control system 230 communicates via radio waves with a number of radio/computer controlled motors, such as motors 224 and 223 mounted on mounting plate 225, which feather the plurality of blades so that the wind turbine moves about in a predetermined pattern in the sky. This enables tuning of the amount of wind energy that can be extracted. In some embodiments, tuning is able to provide a constant average torque to shaft 204 enabling efficient use of a power extractor, such as power extractor 206. In some embodiments, the control system changes the angle/shape of the plurality of flexible blades to control the position of the wind turbine in the sky as well as the speed at which the wind turbine turns. In some embodiments, control system 230 adjusts the shape/angle of the plurality of flexible blades as a function of rotation to control/steer the wind turbine.

In some embodiments, power extractor 206 comprises a generator that generators power from the rotation of shaft 204. Power extractor 206 is coupled to a power connection box 232 via line 234. In various embodiments, power connection box provides an interface to a power distribution grid, converts the power extracted appropriately to connect to a power network, temporarily stores power to be later accessed, or any other intermediate power processing that is required to make the power extracted from the wind turbine useful to a power network.

Power extractor 206 is mounted to wrist joint 208. Wrist joint 208 allows power extractor 206 to be at an angle with respect to base 209. Wrist joint 208 also allows power extractor 206 to stay at the same rotational angle so that line 234 does not get wrapped around as the power extractor 206 changes to moves to different angles.

In some embodiments, the arch of blade 200 and 202 are determined in part by the shape and type of materials of blade 200 and 202 and in part by a plurality of guy lines, which are represented by guy lines 212, 214, 216, 218, 220, and 222 in FIG. 2. The arch in the blades sets the amount of span-wise compression or tension acting at the hub. By minimizing this radial force, aerodynamically induced loading to the shaft is reduced and force requirements required for control are reduced as well.

In some embodiments, blade 200 and blade 202 rotate on a bearing with respect to shaft 204 as does mounting plate 224. Rotation of blade 200 and blade 202 is transferred to mounting plate 224 using one or more guy lines—for example, guy lines 212, 214, 216, 218, 220, and 222. Shaft 204 then does not rotate and power is extracted from the rotation of mounting plate 224—for example, power extractors are mounted to bearings/wheels that turn when mounting plate 224 rotates about shaft 204.

In some embodiments, a single blade rotates (e.g., blade 200) coupled to shaft 204.

Figure 3:
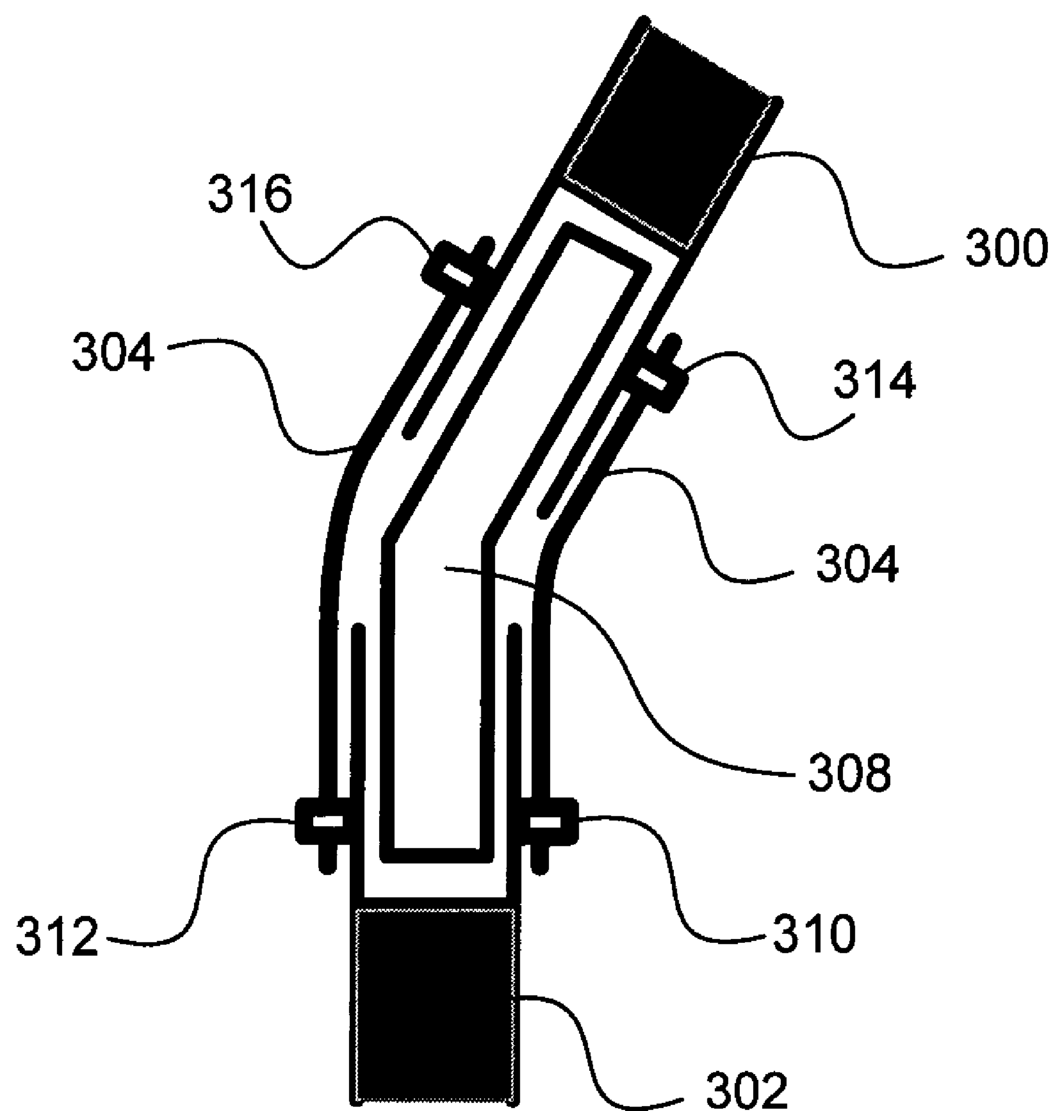
FIG. 3 is a block diagram illustrating an embodiment of a wrist joint.

FIG. 3 is a block diagram illustrating an embodiment of a wrist joint. In some embodiments, the wrist joint of FIG. 3 is used to implement wrist joint 208. In the example shown, socket 302 is coupled to a base. Wrist pin 308 is a rod with an angle bent into it. Wrist pin 308 is allowed to seat in socket 302. Wrist pin 302 is allowed to seat in socket 300. Socket 300 is coupled to a power extractor. As socket 300 moves around in a circle socket 302 stays still. By attaching a flexible sleeve 304 between socket 300 and socket 302, socket 300 and socket 302 stay rotationally fixed with respect to each other. Flexible sleeve 304 is attached to socket 302 with fasteners 310 and 312. Flexible sleeve 304 is attached to socket 300 with fasteners 314 and 316.

Figure 4:
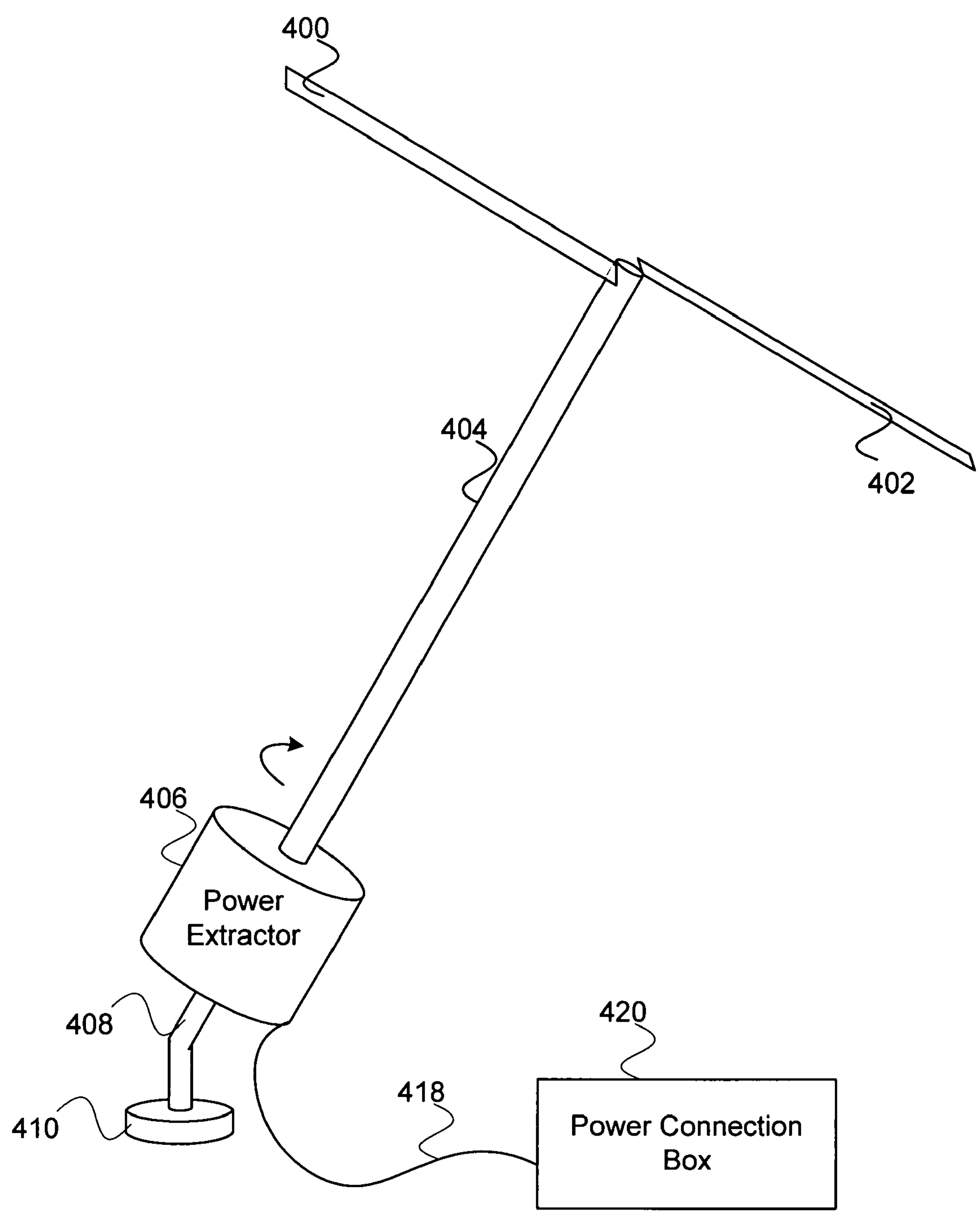
FIG. 4 is a block diagram illustrating an embodiment of a wind power generating system.

FIG. 4 is a block diagram illustrating an embodiment of a wind power generating system. In the example shown, a plurality of blades, represented by blades 400 and 402, are coupled to shaft 404. The plurality of blades capture wind energy and provide lift and torque to shaft 404. In various embodiments, the blades are flexible or stiff. In some embodiments, the stiffness enables a self-adjusting ability for a blade with respect to wind impinging upon the blade: in higher wind conditions the blade changes shape to capture less wind compared to more wind captured in lower wind conditions. Shaft 404 is coupled to power extractor 406. In some embodiments, power extractor 406 comprises a generator that generates power from rotating shaft 404. In various embodiments, shaft 404 comprises an aluminum pole, a fiber glass pole, or any other appropriate rigid material pole. In various embodiments, blades 400 and 402 comprise aluminum, fiber glass, or any other appropriate rigid material blades.

Power extractor 406 is mounted to wrist joint 408. Wrist joint 408 enables power extractor to rotate around to different angles without rotating with respect to base 410. Wrist joint 408 is coupled to base 410. The wrist joint enables line 418 which is connected to power extractor 406 and power connection box 420 to not twist around while the wind turbine is allowed to freely rotate to different angles.

Power connection box 420 comprises a connection to a power distribution grid, a converter for the power extracted to appropriately connect to a power network, a temporary power storage device or system, or any other intermediate power processor that is required to make the power extracted from the wind turbine useful to a power network.

Figure 5:
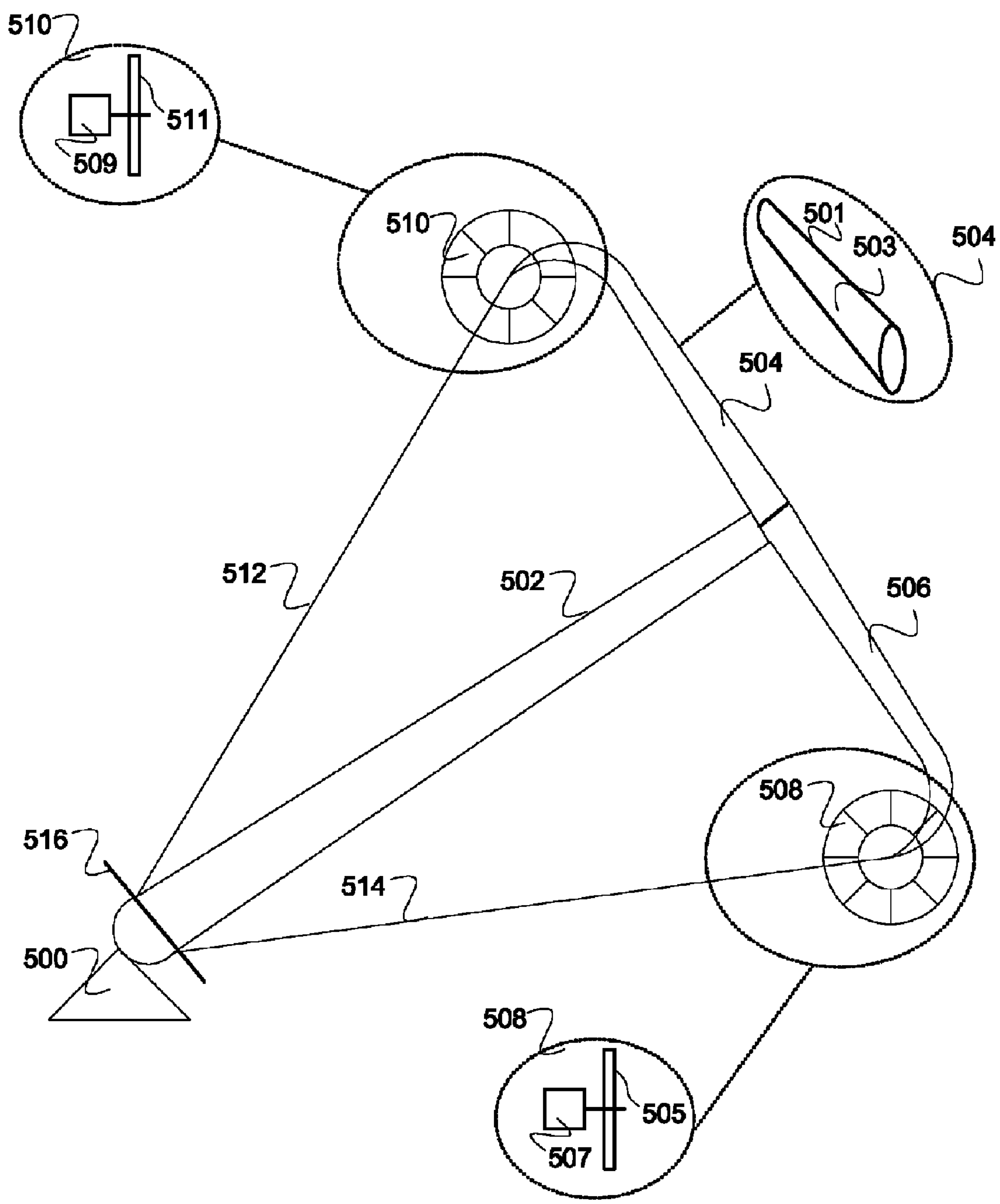
FIG. 5 is a block diagram illustrating an embodiment of a wind power generating system.

FIG. 5 is a block diagram illustrating an embodiment of a wind power generating system. In the example shown, base 500 supports shaft 502 and enables shaft 502 to pivot to different angles with respect to base 500. Base 500 is supported by the ground and/or can rotate with respect to the ground. Shaft 502 is coupled to blade 504 and blade 506. Blade 504 and blade 506 provide a lifting force when wind (or air current) impinges on blades 504 and blade 506 by rotating with shaft 502. The lift force is substantially directed along shaft 502. Force is transmitted from the blades by guy lines (e.g., guy lines 512 and 514) and shaft 502 and to the ground via base 500. In various embodiments, there are a plurality of blades (e.g., three, four, five, six, etc. blades). Blade 504 and blade 506 support propeller and generator units 508 and 510. In various embodiments, propeller and generator units, such as propeller and generator units 508 and 510, can be placed at the ends of blade 504 and blade 506 or anywhere along blade 504 and blade 506. Propeller and generator units 508 and 510 provide electrical generation ability. Guy lines 512 and 514 provide coupling of blade 504 and blade 506 to shaft 502. Propeller and generator unit 510 comprises generator unit 509 coupled to propeller 511. Propeller and generator unit 508 comprises generator unit 507 coupled to propeller 505.

In some embodiments, propeller and generator units 508 and 510 each comprise a high speed propeller directly coupled to a high speed generator unit. This configuration eliminates the need for a gearbox between the main shaft and the generator and also transmission of the torque through shaft 502. Cyclic control of the wind power generation system can be achieved by controlling the power output of the generators and/or the propellers directly.

In various embodiments, shaft 502 is comprised of a flexible material and/or is inflated (e.g., with hot air, with a lighter than air gas, and/or pressurized). In various embodiments, blade 504 and/or blade 506 is comprised of a flexible material and/or is inflated (e.g., with hot air, with a lighter than air gas, and/or pressurized). For example, blade 504 comprises material 501 and inflated space 503.

In some embodiments, the wind power generation system is swept around in the sky to capture wind energy from a greater sky area.

In some embodiments, blade 504 and blade 506 rotate on a bearing with respect to shaft 502 as do the anchors for guy lines 512 and 514 (e.g., anchors for guy lines 512 and 514 are attached to mounting plate 516); Shaft 502 then does not rotate and power can be extracted from the rotation of mounting plate 516—for example, power extractors are mounted to bearings/wheels that turn when mounting plate 516 rotates about shaft 502.

In some embodiments, a single blade rotates (e.g., blade 504) coupled to shaft 502.

Figure 6:
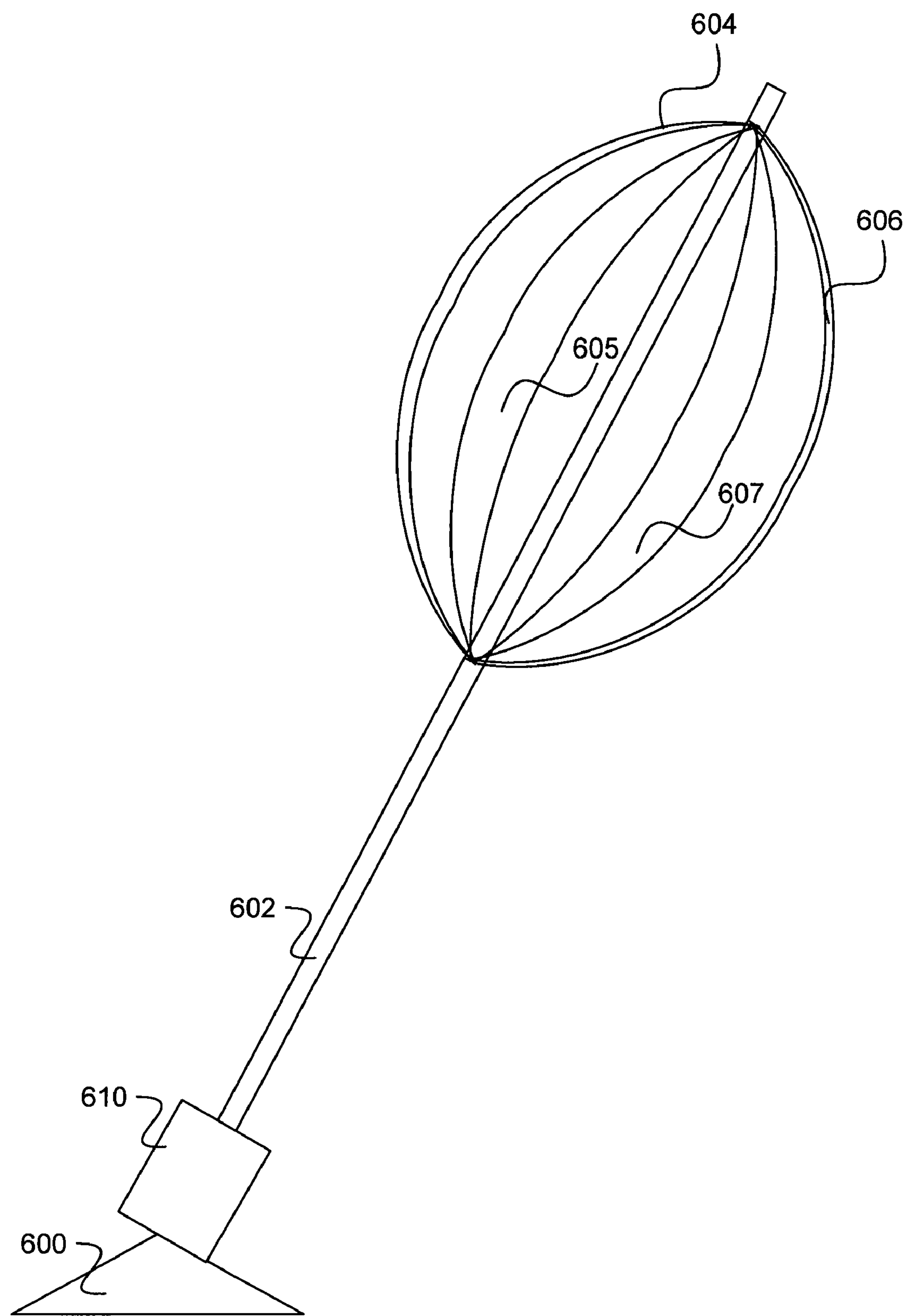
FIG. 6 is a block diagram illustrating an embodiment of a wind power generating system.

FIG. 6 is a block diagram illustrating an embodiment of a wind power generating system. In the example shown, base 600 supports generator 610 that is coupled to shaft 602. Base 600 enables generator 610 and shaft 602 to pivot to different angles with respect to base 600. Base 600 is supported by the ground and/or can rotate with respect to the ground. Shaft 602 is coupled to blade 604, blade 605, blade 606, and blade 607.

The blades—such as blade 604, blade 605, blade 606, and blade 607 in a Darius-type configuration—provide a lifting force when wind (or air current) impinges on the blades by rotating with shaft 602. In various embodiments, there are a plurality of blades (e.g., two, three, four, five, six, etc. blades). Generator 610 provides electrical generation ability.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A wind power generating system comprising:

a shaft, wherein the shaft is inflated;

a blade to capture wind energy, wherein a rotation of the blade occurs in response to the captured wind energy and wherein a lift force is generated from the captured wind energy by the blade that is substantially along the shaft; and a generator coupled to the blade, wherein a propeller is directly coupled to the generator enabling the generator to generate electricity by capturing wind energy.

2. A wind power generating system as in claim 1, wherein the blade is one of a plurality of blades.

3. A wind power generating system as in claim 1, wherein the generator is one of a plurality of generators coupled to the blade.

4. A wind power generating system as in claim 1, wherein the blade is inflated, and wherein the blade is comprised of a flexible material.

5. A wind power generating system as in claim 1, wherein the shaft is comprised of a flexible material.

6. A wind power generating system as in claim 1, wherein the propeller is used to control the rotation of the blade around the shaft, by controlling the power output of the generators that are coupled to the propeller.

7. A wind power generating method comprising:

inflating a shaft, wherein the shaft is inflated;

capturing wind energy using a blade, wherein a rotation of the blade occurs in response to the captured wind energy and wherein a lift force is generated from the captured wind energy by the blade that is substantially along the shaft, and wherein the blade is comprised of a flexible material; and generating electricity by capturing wind energy using a generator, wherein the generator is coupled to the blade, wherein a propeller is directly coupled to the generator enabling the generator to generate electricity by capturing wind energy.

8. A wind power generating method as in claim 7, wherein the blade is one of a plurality of blades.

9. A wind power generating method as in claim 7, wherein the generator is one of a plurality of generators coupled to the blade.

10. A wind power generating method as in claim 7, wherein the blade is inflated, and wherein the blade is comprised of a flexible material.

11. A wind power generating method as in claim 7, wherein the shaft is comprised of a flexible material.

12. A wind power generating method as in claim 7, wherein the propeller is used to control the rotation of the blade around the shaft.

* * * * *